(12) United States Patent
Galansky et al.

(10) Patent No.: US 12,675,788 B2
(45) Date of Patent: Jul. 7, 2026

(54) METHOD AND SYSTEM FOR SECURE WALLET RECOVERY VERIFICATION

(71) Applicant: Fireblocks Ltd., Tel Aviv (IL)

(72) Inventors: Arik Galansky, Tel Aviv (IL); Nikolaos Makriyannis, Tel Aviv (IL)

(73) Assignee: Fireblocks Ltd., Tel Aviv (IL)

( * ) Notice: Subject to any disclaimer, the term of this patent is extended or adjusted under 35 U.S.C. 154(b) by 161 days.

(21) Appl. No.: 18/488,653

(22) Filed: Oct. 17, 2023

(65) Prior Publication Data

US 2025/0124429 A1     Apr. 17, 2025

(51) Int. Cl.
 *G06Q 20/36*          (2012.01)
(52) U.S. Cl.
 CPC ................................. *G06Q 20/3674* (2013.01)
(58) Field of Classification Search
 CPC .................................................. G06Q 20/3674
 USPC ........................... 380/30; 709/224, 225, 229
 See application file for complete search history.

(56) References Cited

U.S. PATENT DOCUMENTS

| | | | | |
|---|---|---|---|---|
| 2019/0280866 A1* | 9/2019 | Zhuang | .................... | H04L 9/006 |
| 2020/0005282 A1* | 1/2020 | Kim | ..................... | G06Q 20/065 |
| 2020/0092097 A1* | 3/2020 | Chiu | ................... | G06Q 20/3678 |
| 2020/0349147 A1* | 11/2020 | Vukich | ................ | G06Q 20/065 |
| 2024/0135364 A1* | 4/2024 | Agudelo | .............. | G06Q 20/389 |

FOREIGN PATENT DOCUMENTS

| | | | | | |
|---|---|---|---|---|---|
| CN | 111127019 A | * | 5/2020 | ............. | G06F 16/27 |
| CN | 111130762 A | * | 5/2020 | ............. | G06F 16/27 |
| CN | 107920052 B | * | 11/2020 | ........... | G06Q 20/065 |

OTHER PUBLICATIONS

Lindell, Yehuda. "Cryptography and MPC in Coinbase Wallet as a Service." Coinbase, Published Jun. 5, 2023, coinbase.bynder.com/m/687ea39fd77aa80e/original/CB-MPC-Whitepaper.pdf. Retrieved Oct. 26, 2023.

Lindell, Yehuda. "Preventing Loss of Crypto Assets with Publicly-Verifiable Encryption and Backup." Coinbase, Published Mar. 8, 2023, www.coinbase.com/blog/preventing-loss-of-crypto-assets-with-publicly-verifiable-encryption-and. Retrieved Oct. 26, 2023.

\* cited by examiner

*Primary Examiner* — Liang Che A Wang
(74) *Attorney, Agent, or Firm* — M&B IP Analysts, LLC

(57)          ABSTRACT

A system and method for wallet recovery verification are provided. The system includes a processor of a wallet verifier node connected to an at least one wallet operator entity node and to at least one backup provider entity node; and a memory on which are stored machine-readable instructions that when executed by the processor, cause the processor to: receive, from the at least one wallet operator entity node backup data comprising $(X, C, \psi)$, where C is a ciphertext encrypting a secret key of the at least one wallet operator entity node, w is a zero-knowledge proof and X is an address of the wallet being backed up; execute a verification algorithm based on the $(X, C, \psi)$, and a public key N received from the at least one backup provider entity node; and derive the address X and verify that a combination of a primary address with a seed produced the derived address.

10 Claims, 4 Drawing Sheets

S302 Requests a signature for the public key N, from the at least one backup provider, based on an unpredictable message S304 Verify the signature against the public key N S306 Receive zero-knowledge proof ZKP comprising ZKP = (A,U,C0,C1,r) if b = 0 and ZKP = (A,U,C0,C1,x+r) if b = 1, wherein:
 U = PK(r) is private key based on a random number;
 C0 and C1 are values calculated based on the public key N, wherein C0 = Enc(r) and
 C1 = Enc(x+r); and
 b is a bit computed as b = HASH(A,U,C0,C1, N).

S308 Verify the ZKP by parsing the ZKP = (A,U,C0,C1,y) and setting b= HASH(A,U,C0,C1, N)

S310 Perform verification comprising:
 if b = 0, check that C0 = Enc(y) and PK(y) = U S312 Perform verification comprising:
 if b = 1, check that C1 = Enc(y) and PK(y) = A*U S314 Output "true" if no error is detected

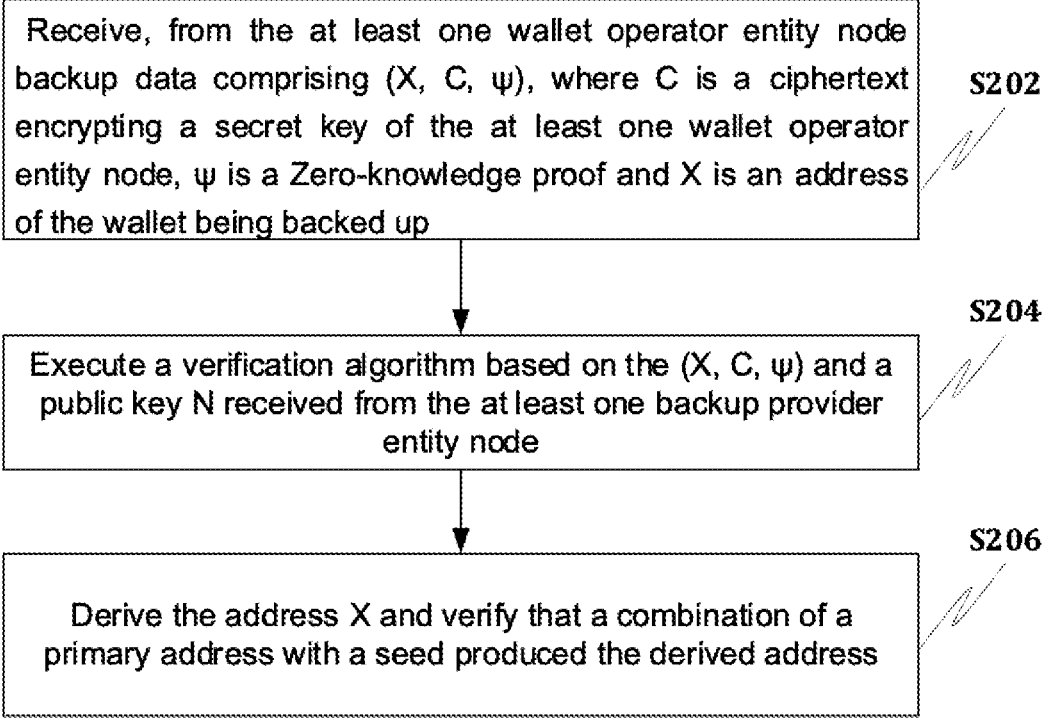

Receive, from the at least one wallet operator entity node backup data comprising (X, C, ψ), where C is a ciphertext encrypting a secret key of the at least one wallet operator entity node, ψ is a Zero-knowledge proof and X is an address of the wallet being backed up

S202

Execute a verification algorithm based on the (X, C, ψ) and a public key N received from the at least one backup provider entity node

S204

Derive the address X and verify that a combination of a primary address with a seed produced the derived address

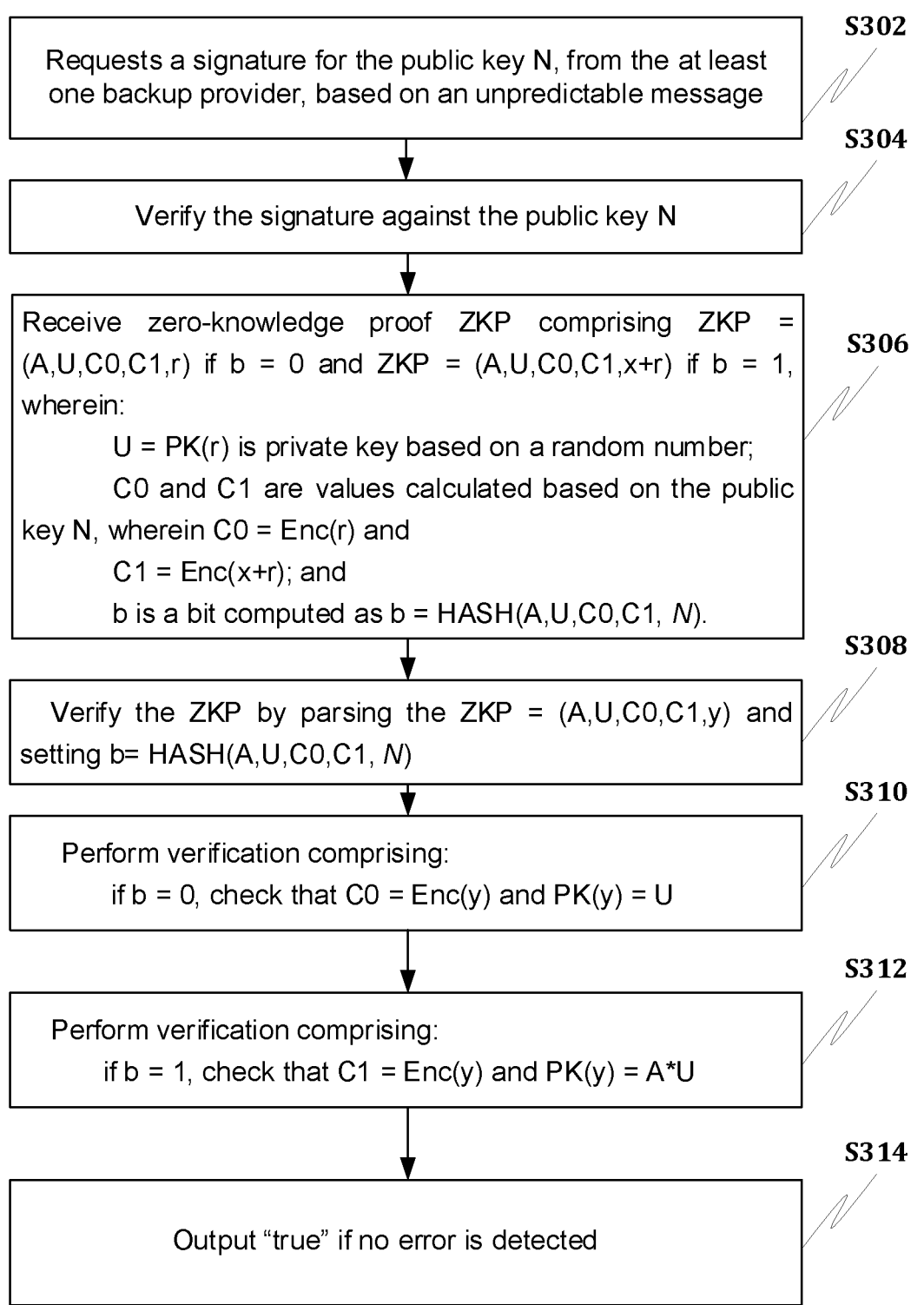

Requests a signature for the public key N, from the at least one backup provider, based on an unpredictable message

S302

Verify the signature against the public key N

S304

Receive zero-knowledge proof ZKP comprising ZKP = (A,U,C0,C1,r) if b = 0 and ZKP = (A,U,C0,C1,x+r) if b = 1, wherein:

U = PK(r) is private key based on a random number;

C0 and C1 are values calculated based on the public key N, wherein C0 = Enc(r) and C1 = Enc(x+r); and b is a bit computed as b = HASH(A,U,C0,C1, N).

S306

Verify the ZKP by parsing the ZKP = (A,U,C0,C1,y) and setting b= HASH(A,U,C0,C1, N)

S308

Perform verification comprising:
if b = 0, check that C0 = Enc(y) and PK(y) = U

S310

Perform verification comprising:
if b = 1, check that C1 = Enc(y) and PK(y) = A*U

S312

Output "true" if no error is detected

METHOD AND SYSTEM FOR SECURE WALLET RECOVERY VERIFICATION

TECHNICAL FIELD

The present disclosure relates generally to secure storage using digital wallets and, more specifically, to wallet recovery verification.

BACKGROUND

A typical "crypto wallet" is controlled by a private key and represented by a public key. The private key can be used to sign transactions/operations that are validated on the blockchain and then perform an operation on the account. Some crypto wallets use split private keys that may be conventionally split by SSS (Shamir Secret Sharing) or by MPC (Multi-Party Computation) so that there are multiple shares of the private key. Then, the split portions of the private key are used for the signing operation together to create valid signatures by the "combined" private key that would validate on the blockchain in the same way.

Given the nature of the crypto wallets, losing access to the private key is equivalent to losing access to the funds stored in the corresponding public address. Therefore, it is crucial to have a proper backup of the private key and all relevant materials to create valid signatures on the blockchain. However, existing digital wallets do not have reliably verifiable backups.

Accordingly, a method and system for digital wallet recovery verification are desired.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, system may include a processor of a wallet verifier node connected to an at least one wallet operator entity node and to at least one backup provider entity node; and a memory on which are stored machine-readable instructions that when executed by the processor, cause the processor to: receive, from the at least one wallet operator entity node backup data having $(X, C, \psi)$, where C is a ciphertext encrypting a secret key of the at least one wallet operator entity node, $\psi$ is a zero-knowledge proof and X is an address of the wallet being backed up; execute a verification algorithm based on the $(X, C, \psi)$, and a public key N received from the at least one backup provider entity node; and derive the address X and verify that a combination of a primary address with a seed produced the derived address. Other embodiments of this aspect include corresponding computer systems, apparatus, and computer programs recorded on one or more computer storage devices, each configured to perform the actions of the methods.

In one general aspect, method may include receiving, by a wallet verifier node, from at least one wallet operator entity node backup data having $(X, C, \psi)$, where C is a ciphertext encrypting a secret key of the at least one wallet operator entity node, $\psi$ is a Zero-knowledge proof and X is an address of the wallet being backed up; executing, by a wallet verifier node, a verification algorithm based on the $(X, C, \psi)$ and a public key N received from at least one backup provider entity node; and deriving, by a wallet verifier node, the address X and verifying that a combination of a primary address with a seed produced the derived address. Other embodiments of this aspect include corresponding computer systems, apparatus, and computer programs recorded on one or more computer storage devices, each configured to perform the actions of the methods.

In one general aspect, non-transitory computer-readable medium may include receiving backup data having $X, C, \psi$, where C is a ciphertext encrypting a secret key of an at least one wallet operator entity node, $\psi$ is a Zero-knowledge proof and X is an address of a wallet being backed up; executing a verification algorithm based on the X, C, $\psi$ and a public key N received from at least one backup provider entity node; and deriving the address X and verifying that a combination of a primary address with a seed produced the derived address. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example flowchart of a method for wallet recovery verification consistent with the disclosed embodiments.

FIG. 3 is a further example flowchart of a method for wallet recovery verification consistent with the disclosed embodiments.

DETAILED DESCRIPTION

Figure 1:
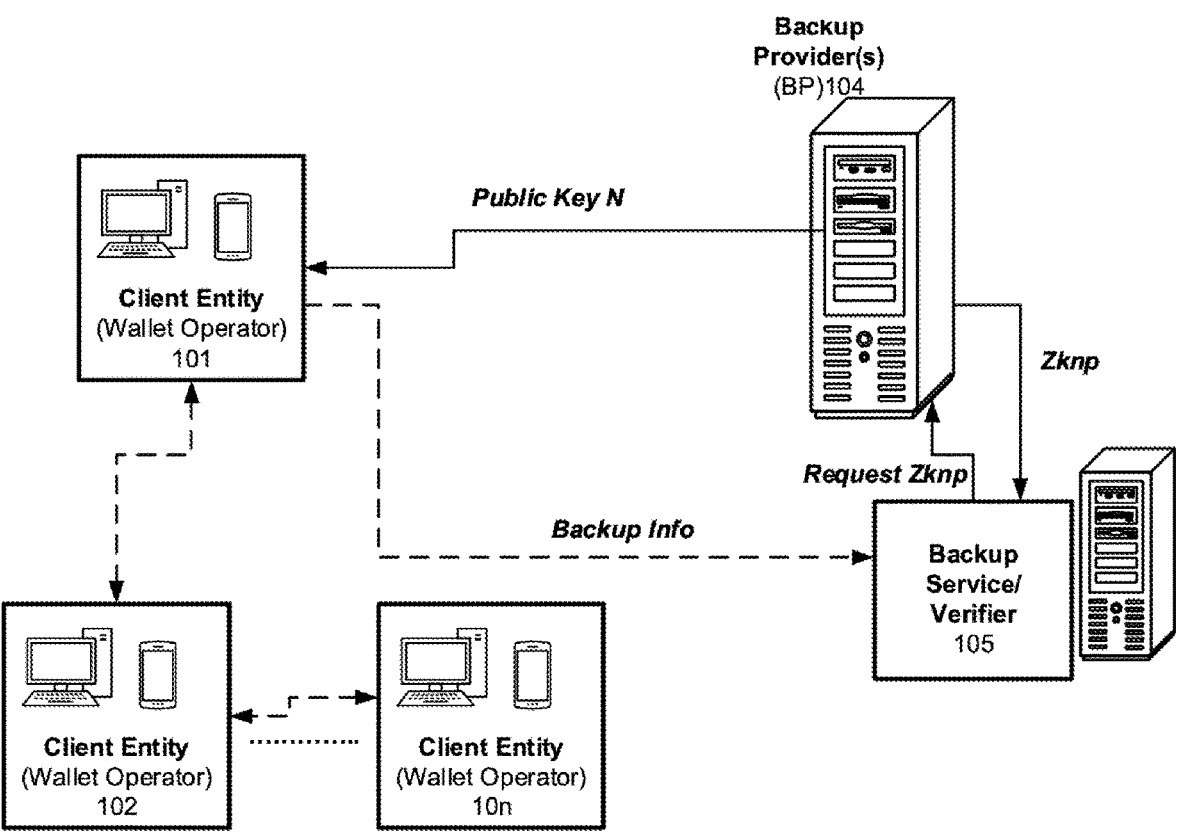
FIG. 1 is a schematic diagram explaining an environment for wallet recovery verification consistent with the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a novel method for verifying that an entity has all of the components to access a wallet on the blockchain, while the private key (secret material) and any encryption key used in the process are not exposed, is provided.

In one embodiment, a client or wallet operator, or combination of them, holds a single private key or multiple shares of a private key (via MPC/SSS). This private key may be referred to as a blockchain key.

The holders of all partials of the key with the ability to sign with them may be referred to as co-signers. A backup service provides R public keys (R is an integer equal or greater than 1) that will be used to encrypt the backup in a number of backup packets. The corresponding private keys are protected in a way that allows secure encryption/decryption/signing. All the co-signers perform a backup creation operation where they backup the secret material in R backup packets protected by 'R' private keys (corresponding to the public keys provided). The backup packets hold the secret material (part of the blockchain key), a zero-knowledge proof of the validity of the backup and the information about the public address.

It should be noted that the operation can be limited to being performed only given a proof that the proper policy was run to activate the process of backup (either via zero-knowledge or via signatures verification). In other words, there may be a gateway before activating the backup to make sure that a rogue party cannot activate a backup process with malicious R and get access to the key.

The backup packets are stored in secure locations by the client or its representatives. A backup verification is performed by a verification process executed on all of the backup packets. In an example embodiment, the verification process includes:

determining whether the backup packet is proper by verifying the zero-knowledge proof;

determining whether the private key of the backup is proper by requesting for a signature, and verifying the requested signature, once received, against the backup packet; and validating that all backups are proper (upon determination that the backup packet and the private key are proper), so that the full backup is verified.

According to the disclosed embodiments, a method of wallet recovery verification process is also provided. In an example embodiment, the wallet recovery verification process can be implemented as follows: Let x denote the blockchain secret share and $A=PK(x)$ denote the public share derived from x. Furthermore, let N denote the public key. For simplicity, consider R=1, i.e., there is only one public key N. It should be noted that a backup public key and a public key are the same.

In order to verifiably encrypt x, the backup packet is prepared as follows:

1. Sample random secret r and set $U=PK(r)$, where r is a shard of the private key, and r is critical for reconstructing the full private key later. $U=PK(r)$, where U is a public value component derived from r that is not sufficient for reconstructing the private key. Rather, the public component value U is vital for verification purposes, namely verifying the zero-knowledge proof. In other words, U may represent the public component of a shard of the private key.

2. Using the public key N, calculate $C0=Enc(r)$ and $C1=Enc(x+r)$;

3. Compute bit $b=HASH(A, U, C0, C1)$;

4. Output $ZKP=(A, U, C0, C1, r)$ if b=0 and $ZKP=(A, U, C0, C1, x+r)$ if b=1

To verify the ZKP, the verifier proceeds as follows:

a. Parse $ZKP=(A, U, C0, C1, y)$;

b. Set $b=HASH(A, U, C0, C1, N)$;

c. If b=0, check that $C0=Enc(y)$ and $PK(y)=U$;

d. If b=1, check that $C1=Enc(y)$ and $PK(y)=A*U$;

e. Output "true" if no error is detected.

It should be noted that the operator denoted by '*' indicates a binary operation for combining two blockchain addresses. In an example, the binary operation may include a point addition of elliptic curve points.

To verify that the backup secret key is still active:

a. Request a signature for an unpredictable message from the owner of the public key N;

b. When obtaining the signature, verify that the signature is a valid signature for the message and the public key N.

c. Output true if no error in verification is detected.

It should be noted that while the proof process discussed above requires multiple iterations to achieve suitable strength, a single iteration case is reviewed for simplicity.

In one embodiment, the recovery/reconstruction of the blockchain secret is implemented as following:

decrypt C0 and C1 using the secret key associated with the public key N (let y0 and y1 denote the respective plaintexts); and output $w=y1-y0$ if $X=PK(w)$.

It should be noted that with a high-enough number of iterations of the ZKP, the above process, advantageously, yields the correct secret w, with very high probability.

FIG. 1 illustrates a schematic diagram explaining an environment for the wallet recovery verification process according to the disclosed embodiments.

The Wallet Shareholders (SHs) or wallet operators 101-10n are linked to a share of the secret material associated with the wallet. X is used for the wallet address. Backup Providers (BPs) 104 (one shown for simplicity). Each BP 104 holds an encryption key and knows the corresponding decryption key.

A backup service 105 may be implemented on a separate server node and serves as a Wallet Verifier. Note that the backup service 105 verifies but does not hold any secret material.

In a sample use only one SH/wallet operator 101 and one backup provider (BP) 104 are involved. In order to generate a backup packet, SH/wallet operator 101 is configured to execute a randomized algorithm using the following input-outputs. The inputs to the system may include:

1. A wallet address X;

2. A secret key share w; and 3. public key N.

The secret key share w is provided by the SH/wallet operator 101. The Output is $(X, C, \psi)$, where C is a special ciphertext (encrypting w) and $\psi$ is a Zero-knowledge proof.

The backup packet integrity verification is implemented as follows. The backup service/wallet verifier 105 residing on a separate network node is configured to inspect $(X, N, C, \psi)$ and execute a verification algorithm. To validate derived addresses, the backup material can be augmented with the non-hardened derivation seed. This enables the backup service/wallet verifier 105 to confirm that combining the primary address with the seed produces the derived addresses (via the derivation algorithm).

In one embodiment, the wallet recovery verification process is implemented as follows. The backup service/wallet verifier 105 requests a signature for the public key N based on an unpredictable message (e.g., the latest blockchain block). It should be noted that multiple backup providers may be used and each of the backup providers provides with their own individual public key N.

Once the signature is verified against the public key N, the verifier is convinced that the decryption key is still accessible, concluding the verification process. A key requirement for the proposed verification process is the ability of decryption keys to function as signing keys. However, it should be noted that the most prominent schemes, such as RSA and those based on Elliptic curves, support this capability. Advantageously, the use of decryption keys as signing keys represents a specific instance of the broader proof-of-knowledge paradigm, affirming knowledge of the decryption key associated with the public key N.

A general use case employs multiple 'n' SHs (101-10$n$) and 'k' BPs 104, where 'n' and 'k' are integer numbers. In this use case, in addition to the values specified above, the non-secret input also contains:

1. The access structure of the shareholders (i.e., a formal description of all the quorums);
2. The public share $X_i$ i of each shareholder associated with the $w_i$; and
3. The access structure of the backup providers.

In this use case, the backup packet generation is implemented as follows. During the packet generation, the i-th shareholder outputs k tuples $(X_{ij}, C_{ij}, \psi_{ij})$, where j runs from 1 to k (for each backup provider 104). The final backup packet consists of all the k times n relevant tuples.

The backup packet integrity verification is implemented as follows. Similar to the simple use case, the backup service/wallet verifier 105 is configured to receive as input $(X_{ij}, C_{ij}, \psi_{ij})$ and execute a verification algorithm that outputs accept or reject for each tuple. Further, the backup service/wallet verifier 105 may be configured to check that the $X_{ij}$'s are consistent with the wallet address X and the specified access structures (one for the SHs 101-101$n$ and one for the BPs 104). Derived addresses are verified in the same manner as previously described for simple use case. During the wallet recovery verification. The backup service/wallet verifier 105 may be further configured to request a different signature for each encryption key Non an unpredictable message (e.g., the latest blockchain block), so the main difference is that the backup service/wallet verifier 105 requests a signature from each of the k different backup providers 104.

FIG. 2 is an example flowchart of a method for wallet recovery verification process according to the disclosed embodiments.

At S202, the processor of the verifier 105 may receive from a wallet operator entity node 101 backup data including (X, C, $\psi$), where C is a ciphertext encrypting a secret key of the at least one wallet operator entity node, $\psi$ is a Zero-knowledge proof and X is an address of the wallet being backed up.

At S204, the processor of the verifier 105 may execute a verification algorithm based on the (X, C, $\psi$) and a public key N received from at least one backup provider entity node 104.

At S206, the processor of the verifier (e.g., verifier 105) may derive the address X and verify that a combination of a primary address with a seed produced the derived address.

FIG. 3 is a further example flowchart of a method for wallet recovery verification process according to the disclosed embodiments.

Referring to FIG. 3, at S302, the processor of the verifier 105 may request a signature for the public key N, from the at least one backup provider, based on an unpredictable message.

At S304, the processor of the verifier 105 may verify the signature against the public key N.

At S306, the processor of the verifier 105 may receive zero-knowledge proof ZKP comprising ZKP=(A, U, C0, C1, r) if b=0 and ZKP=(A, U, C0, C1, x+r) if b=1, where U=PK(r) may represent the public component of a shard 'r' of the private key; C0 and C1 are values calculated based on the public key N, where C0=Enc(r) and C1=Enc(x+r); and b is a bit computed as b=HASH(A, U, C0, C1, N).

At S308, the processor of the verifier 105 may verify the ZKP by parsing the ZKP=(A, U, C0, C1, y) and setting b=HASH(A, U, C0, C1, N). At S310, the processor of the verifier 105 may perform verification: if b=0, check that C0=Enc(y) and PK(y)=U.

At S312, the processor of the verifier 105 may perform verification: if b=1, check that C1=Enc(y) and PK(y)=A*U.

At S314, the processor of the verifier 105 may output "true" if no error is detected.

Figure 4:
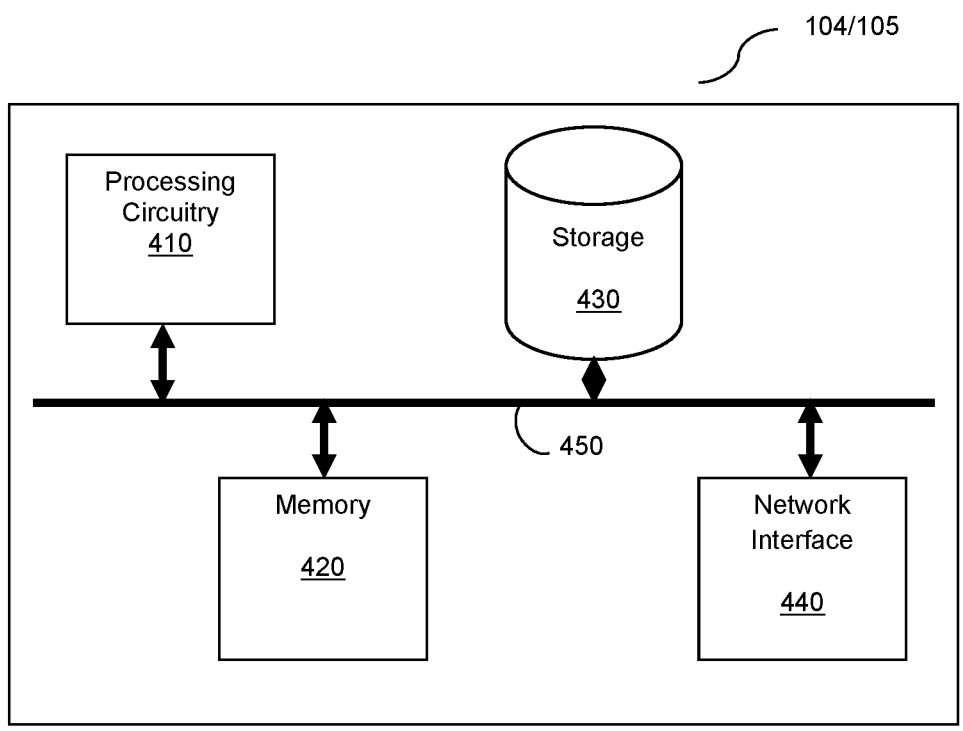
FIG. 4 is a schematic diagram of a hardware layer of a node according to an embodiment.

FIG. 4 is an example block diagram of a hardware layer depicting a node 104, according to an embodiment. The node 240 may be a compute node or a network node and includes a processing circuitry 410 coupled to a memory 420, a storage 430, and a network interface 440. In an embodiment, the components of the verification system may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 440 allows the node 104/105 to communicate with the various components, devices, and systems described herein for production code static analysis, as well as other, like, purposes. The network interface 440 can be a port of the network node.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A system for wallet recovery verification, comprising:
a processor of a wallet verifier node connected to an at least one wallet operator entity node and to at least one backup provider entity node; and
a memory having stored thereon machine-readable instructions that, when executed by the processor, configure the processor to:
receive, from the at least one wallet operator entity node backup data comprising a ciphertext encrypting a secret key of the at least one wallet operator entity node, a zero-knowledge proof and an address of a wallet being backed up;
parse the zero-knowledge proof in order to produce a parsing result;
set a value of a bit to a first value or a second value based on the parsing result;

execute a verification algorithm based on the ciphertext, the zero-knowledge proof, the address of the wallet, and a public key received from the at least one backup provider entity node, wherein executing the verification algorithm includes performing a comparison, wherein the comparison uses a first calculation based on the public key when the value of the bit is set to the first value, wherein the comparison uses a second calculation based on the public key when the value of the bit is set to the second value, wherein the verification algorithm outputs true when the result of the comparison yields an equal result; and
verify whether the backup of the wallet provides access to the wallet on the blockchain based on the true output of the verification algorithm.

2. The system of claim 1, further comprising machine-readable instructions that when executed by the processor, cause the processor to:
request a signature for the public key, from the at least one backup provider entity node.

3. The system of claim 2, further comprising machine-readable instructions that when executed by the processor, cause the processor to:
verify the signature against the public key.

4. The system of claim 1, wherein each backup provider entity node holds an encryption key and knows a corresponding decryption key, wherein each decryption key functions as a signing key.

5. A method for wallet recovery verification, comprising:
receiving, by a wallet verifier node, from at least one wallet operator entity node backup data comprising a ciphertext encrypting a secret key of the at least one wallet operator entity node, a zero-knowledge proof and an address of a wallet being backed up;
parsing the zero-knowledge proof in order to produce a parsing result;
setting a value of a bit to a first value or a second value based on the parsing result;
executing, by the wallet verifier node, a verification algorithm based on the ciphertext, the zero-knowledge proof, the address of the wallet, and a public key received from the at least one backup provider entity node, wherein executing the verification algorithm includes performing a comparison, wherein the comparison uses a first calculation based on the public key when the value of the bit is set to the first value, wherein the comparison uses a second calculation based on the public key when the value of the bit is set to the second value, wherein the verification algorithm outputs true when the result of the comparison yields an equal result; and
verifying whether the backup of the wallet provides access to the wallet on the blockchain based on the true output of the verification algorithm.

6. The method of claim 5, further comprising requesting a signature for the public key, from the at least one backup provider entity node.

7. The method of claim 6, further comprising verifying the signature against the public key.

8. The method of claim 5, wherein each backup provider entity node holds an encryption key and knows a corresponding decryption key, wherein each decryption key functions as a signing key.

9. A non-transitory computer-readable medium having stored thereon instructions for causing a processing circuitry to execute a process, the process comprising:

receiving, by a wallet verifier node, from at least one wallet operator entity node backup data comprising a ciphertext encrypting a secret key of the at least one wallet operator entity node, a zero-knowledge proof and an address of a wallet being backed up;

parsing the zero-knowledge proof in order to produce a parsing result:

setting a value of a bit to a first value or a second value based on the parsing result;

executing, by the wallet verifier node, a verification algorithm based on the ciphertext, the zero-knowledge proof, the address of the wallet, and a public key received from the at least one backup provider entity node, wherein executing the verification algorithm includes performing a comparison, wherein the comparison uses a first calculation based on the public key when the value of the bit is set to the first value, wherein the comparison uses a second calculation based on the public key when the value of the bit is set to the second value, wherein the verification algorithm outputs true when the result of the comparison yields an equal result; and verifying whether the backup of the wallet provides access to the wallet on the blockchain based on the true output of the verification algorithm.

10. The non-transitory computer-readable medium of claim 9 having stored thereon instructions for causing a processing circuitry to execute a process, the process comprising requesting a signature for the public key N, from the at least one backup provider entity node, based on an unpredictable message.

\* \* \* \* \*